(12) United States Patent
Campos et al.

(10) Patent No.: US 12,074,646 B1
(45) Date of Patent: Aug. 27, 2024

(54) SYSTEMS AND METHODS FOR COHERENT BURST RECEPTION

(71) Applicant: CABLE TELEVISION LABORATORIES, INC., Louisville, CO (US)

(72) Inventors: Luis Alberto Campos, Superior, CO (US); Zhensheng Jia, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 4 days.

(21) Appl. No.: 17/896,541

(22) Filed: Aug. 26, 2022

Related U.S. Application Data (60) Provisional application No. 63/237,336, filed on Aug. 26, 2021.

(51) Int. Cl.
  *H04B 10/61* (2013.01)
  *H04B 10/27* (2013.01)
  *H04Q 11/00* (2006.01)

(52) U.S. Cl.
  CPC ........... *H04B 10/612* (2013.01); *H04B 10/27* (2013.01); *H04Q 11/0067* (2013.01)

(58) Field of Classification Search
  CPC ... H04B 10/612; H04B 10/27; H04Q 11/0067
  (Continued)

(56) References Cited

U.S. PATENT DOCUMENTS

| | | | |
|---|---|---|---|
| 11,101,895 B2 * | 8/2021 | Zhang | H04B 10/69 |
| 11,575,448 B1 | 2/2023 | Zhang et al. | |

(Continued)

FOREIGN PATENT DOCUMENTS

| | | |
|---|---|---|
| CN | 103999382 A | 8/2014 |
| CN | 106489245 A | 3/2017 |
| JP | 2014168176 A | 9/2014 |

OTHER PUBLICATIONS

Zhang J et al; Coherent Passive Optical Networks for 100G -and-Beyond Fiber Access: Recent Progress and Outlook; Mar. 2022; IEEE; pp. 1-8. (Year: 2022).*

(Continued)

*Primary Examiner* — Amritbir K Sandhu
(74) *Attorney, Agent, or Firm* — Josh C. Snider; Snider IP (57) ABSTRACT

An optical transceiver is provided for a network communication system utilizing a coherent passive optical network (CPON). The optical transceiver includes a downstream transmitter in operable communication with an optical communication medium. The downstream transmitter is configured to schedule upstream resource allocation blocks to first and second downstream transceivers disposed along the optical communication medium at different respective locations remote from the optical transceiver. The optical transceiver further includes an upstream burst receiver system configured to simultaneously detect (i) a first upstream burst transmission sent from the first downstream transceiver along a first frequency subchannel of an optical spectrum of the CPON, and (ii) a second upstream burst transmission sent from the second downstream transceiver along a second frequency subchannel of the optical spectrum different from the first frequency subchannel. The first and second upstream burst transmissions do not overlap in the frequency domain.

17 Claims, 7 Drawing Sheets

(58) Field of Classification Search
USPC .......................................................... 398/202
See application file for complete search history.

(56) References Cited

U.S. PATENT DOCUMENTS

| | | | | |
|---|---|---|---|---|
| 2013/0011138 A1* | 1/2013 | Kim | .................... | H04L 27/2697 |
| | | | | 398/79 |
| 2013/0022355 A1* | 1/2013 | Charlet | ............... | H04J 14/0208 |
| | | | | 398/79 |
| 2014/0348515 A1 | 11/2014 | Tsubouchi | | |
| 2015/0365172 A1 | 12/2015 | Luo et al. | | |
| 2018/0278360 A1* | 9/2018 | Jia | ........................ | H04J 14/0282 |
| 2021/0400364 A1* | 12/2021 | Qiu | .................... | H04Q 11/0067 |

OTHER PUBLICATIONS

Horvath et al; passive optical networks Progress: A tutorial; Jul. 2020; MDPI; pp. 1-30. (Year: 2020).*
U.S. Appl. No. 18/104,465, filed Feb. 1, 2023, Junwen Zhang.

\* cited by examiner

SYSTEMS AND METHODS FOR COHERENT BURST RECEPTION

CROSS REFERENCE TO RELATED APPLICATIONS

This application claims the benefit of and priority to U.S. Provisional Patent Application Ser. No. 63/237,336, filed Aug. 26, 2021, which is incorporated herein by reference in its entirety.

BACKGROUND

The field of the disclosure relates generally to fiber communication networks, and more particularly, to access networks capable of transmitting coherent optical signals.

The advance of high-speed wired (e.g., fiber-to-the-premise (FTTP)) access networks has been propelled by new business and technology drivers, such as cloud services, 5G wireless transport, and high bandwidth 4K/8K video applications. Increasing demand for high-speed data and video services is presently driving the access network paradigm bandwidth requirements up to gigabits per second (Gb/s) for residential offerings and multi-Gb/s for business markets in near-future optical access networks. Cable operators, for example, now regularly offer Gb/s service to residential offerings, and access bandwidth requirements therefrom are expected to grow to multi-Gb/s speeds in response to the increasing 4K/8K video streaming, proliferation of cloud computing, "big data," social media, Internet of Things (IOT), and mobile data delivery.

Conventional access network architectures utilize a passive optical network (PON), for example, a Gigabit PON (GPON) within ITU-T, or an Ethernet passive optical network (EPON) within IEEE. PON can be point-to-multipoint (P2MP), and is often an economical alternative to point-to-point Ethernet for moderate to large populations. GPON and EPON have some technical differences in terms of signal encapsulation and dynamic bandwidth allocation, but both PON types are capable of carrying data over fiber through a passive optical network all the way from an optical hub to a customer premise. Both PON types use baseband digital signaling over the fiber to carry information.

Exemplary architectures of coherent PON architectures, as well as the respective components thereof, are described in greater detail in U.S. Pat. Nos. 9,912,409, 10,200,123, and co-pending U.S. patent application Ser. No. 15/609,461, filed May 31, 2017, to the present inventors, the disclosures of all of which are incorporated by reference herein.

In the P2MP paradigm, PON technologies have been one of the dominant architectures to meet the growing high-capacity demand for end users, as further evidenced by the progress in standards bodies developing next generation high speed time-division multiplexing PON (TDM-PON) standards. The IEEE 802.3ca 100G Ethernet PON (EPON) Task Force is moving towards the standardization of 25/50G EPON based on wavelength multiplexing of 25 Gbps per single channel. New projects to standardize higher speed PONs, e.g., 50 Gbps, have also been proposed in the ITU-T Q2/SG15 group. There is thus a continuing need for PONs to evolve to provide higher per-subscriber data rates and wider coverage of services and applications, while at the same time minimizing capital expenditure (CAPEX) and operating expenditure (OPEX) costs, and also increasing reconfigurable capability for scalable solutions.

High-speed PON systems based on single wavelength-with-TDM mechanisms have become conventionally adopted to reduce the number of required optical components and the associated costs thereof, and also to save wavelength resources. However, the limited sensitivity of these systems has become a critical challenge to the further development of direct detection-based high-speed PON systems with high power budgets.

Coherent detection technology has offered effective techniques for increasing receiver sensitivity. Within the PON paradigm, recent coherent detection solutions have improved the receiver sensitivity through coherent beating of signal with a clean local oscillator (LO) signal. These recent solutions support longer distance transmissions and greater numbers of end users, while also enabling high access speeds using multi-dimensional and more advanced modulation formats with higher spectral efficiency. Coherent technology further renders possible advanced digital signal processing (DSP) techniques to enable mitigation of optical and electrical impairments (e.g., chromatic dispersion (CD), etc.) in the digital domain. A major challenge, however, to the implementation of coherent detection-based TDM PON systems, which also exists for non-coherent TDM-PON systems, arises from the upstream burst receiver. A conventional TDM-PON system is described further below with respect to FIG. 1.

Figure 1:
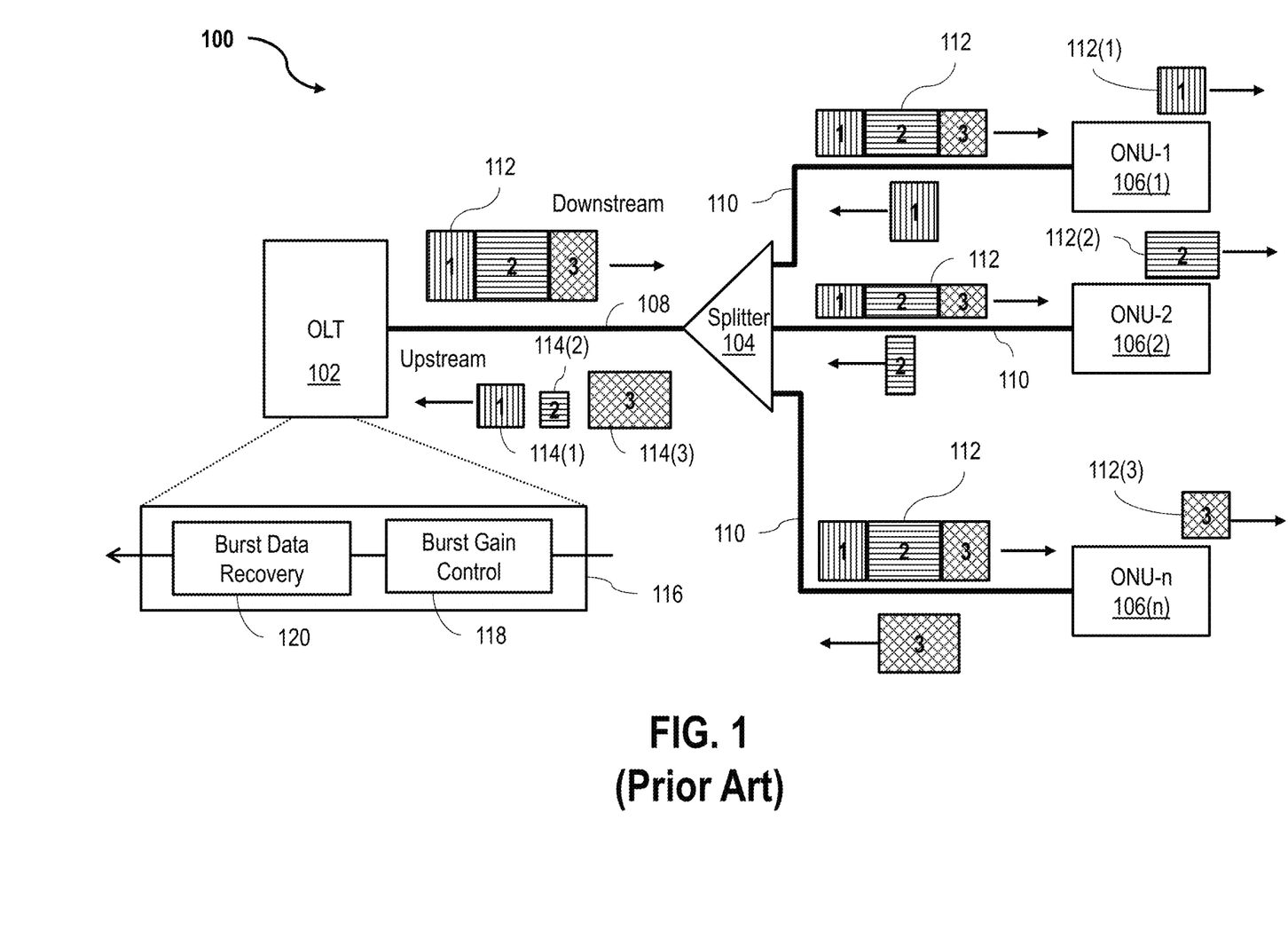
FIG. 1 is a schematic illustration of a conventional time-division multiplexing passive optical network system.

FIG. 1 is a schematic illustration of a conventional TDM PON system 100. System 100 includes a centralized optical line terminal (OLT) 102, a splitter 104, and a plurality of optical network units (ONUs) 106 (i.e., 1–n), which may, for example, be further in communication with a plurality of users or customer premises (not shown). OLT 102 is typically located within a central office, a communications hub, or a headend of optical link, and functions to convert standard signals from a service provider (not shown) to the frequency and framing used by system 100, and also for coordinating multiplexing between conversion devices on ONUs 106. Splitter 104 may represent, for example, a power splitter/combiner.

In the example depicted in FIG. 1, system 100 represents a conventional TDM-PON (e.g., 10G-EPON, 10G-PON (also referred to as XG-PON), etc.) implementing upstream burst technology, in which centralized OLT 102 operably connects with splitter 104 over an optical transport medium 108 (e.g., a single mode fiber (SMF)), which in turn operably connects with ONUs 106 over secondary fibers 110 at different locations throughout the passive optical distribution network (ODN) thereof. In the ODN of conventional TDM PONs, splitter 104 is typically a passive optical power splitter.

In operation of system 100, OLT 102 transmits a downstream burst signal 112, and receives a plurality of upstream burst signals 114. Accordingly, upstream burst signals 114(1), 114(2), 114(2), from different users (i.e., ONUs 106(1), 106(2), 106(n), respectively) arrive at OLT 102 at different time slots, and with different power levels as depicted in the embodiment illustrated in FIG. 1. OLT 102 is therefore required to realize burst clock and data recovery (BCDR) in a relatively short time, in order to reduce the overhead length of the individual bursts of upstream burst signals 114. However, the dynamic range of received power in the upstream direction from upstream burst signals 114 may often be greater than 15 dB, which presents a challenge to this conventional architecture. That is, in order to achieve burst mode reception for upstream burst signals 114, conventional techniques generally require two processing steps 116 (i.e., executed through computer-executable instructions of a processor or by dedicated hardware units therefor) to obtain synchronized signal detection for both burst gain control 118, and for burst data recovery 120.

Exemplary ranging systems and methods for burst reception are described in greater detail in co-pending U.S. Patent Application Ser. No. 17/401,473, filed Aug. 13, 2021, and in co-pending U.S. patent application Ser. No. 17/346,940, filed Jun. 14, 2021, the disclosures of both of which are incorporated by reference herein. There is a need though, for more intelligent adaptable ranging techniques and ranging bypass mechanisms.

BRIEF SUMMARY

An optical transceiver is provided for a network communication system utilizing a coherent passive optical network (CPON). The optical transceiver includes a downstream transmitter in operable communication with an optical communication medium. The downstream transmitter is configured to schedule upstream resource allocation blocks to first and second downstream transceivers disposed along the optical communication medium at different respective locations remote from the optical transceiver. The optical transceiver further includes an upstream burst receiver system configured to simultaneously detect (i) a first upstream burst transmission sent from the first downstream transceiver along a first frequency subchannel of an optical spectrum of the CPON, and (ii) a second upstream burst transmission sent from the second downstream transceiver along a second frequency subchannel of the optical spectrum different from the first frequency subchannel. The first and second upstream burst transmissions do not overlap in the frequency domain.

BRIEF DESCRIPTION

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As used herein, the term "coherent transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and a "distance" between nodes may be physical or perceptual. A hyperscale datacenter may include several performance optimized datacenters (PODs), and each POD may include multiple racks and hundreds and thousands of computers and/or storage devices.

In an exemplary embodiment, systems and methods for coherent burst reception, ranging, redundancy, design implementation, and performance are described herein. Although the present embodiments are described with respect to burst coherent receivers, the person of ordinary skill in the art will understand that many of the innovative techniques described herein are not limited to only the examples of conventional coherent receivers and CPONs described herein. The innovative CPON techniques of the present systems and methods represent significant improvements over conventional PON schemes that are limited to conventional optical receivers lacking the flexibility and intelligent capabilities described below. The present embodiments thus present new and advantageous flexibility for coherent detection in an optical network, and particularly with respect to the burst-mode reception paradigm.

Conventional ranging algorithms, for example, are known to typically require numerous measurements and analyses thereof, together which enable convergence to a final set of ranging parameters. However, a number of scenarios may arise requiring significant adjustment to the ranging parameters of a PON. The required adjustments may be even greater as the number of channels and/or power budget of a PON increases. The burdensome measurement/analysis requirements of conventional ranging algorithms though, do not allow for easy or speedy adjustment to the ranging parameters.

Such ranging adjustment challenges for PON burst reception are overcome through the intelligent adaptable ranging techniques and ranging bypass mechanisms described herein. The present techniques and mechanisms advantageously enable intelligent adjustment to a number of ranging process parameters, including without limitation, power level, delay or timing offset, distortion, and/or dispersion. In some embodiments, these ranging parameter adjustments are intelligently performed as part of ranging processing executed by a processor of an OLT or coherent receiver. In other embodiments, a ranging bypass mechanism enables adjustments that bypass conventional ranging processing. In an exemplary embodiment, the bypass operation of the ranging bypass mechanism may be advantageously configured to make such parameter adjustments in a manner that is invisible to the separate ranging process. For example, the bypass mechanism may be configured to operate invisibly to the ranging process when communication between an OLT and ONU(s) is seamless, i.e., no disruption therebetween.

The present embodiments are further of particular usefulness with respect to the CPON environment and paradigm, which may utilize multiple subchannels and/or frequencies to deliver multi-gigabit services to, and receive upstream communications from, a significant number of downstream end user transceivers (e.g., ONUs). As described further below with respect to FIG. 2, an exemplary CPON realizes seamless service operation through implementation of the present intelligent adaptable ranging algorithms and mechanisms.

Figure 2:
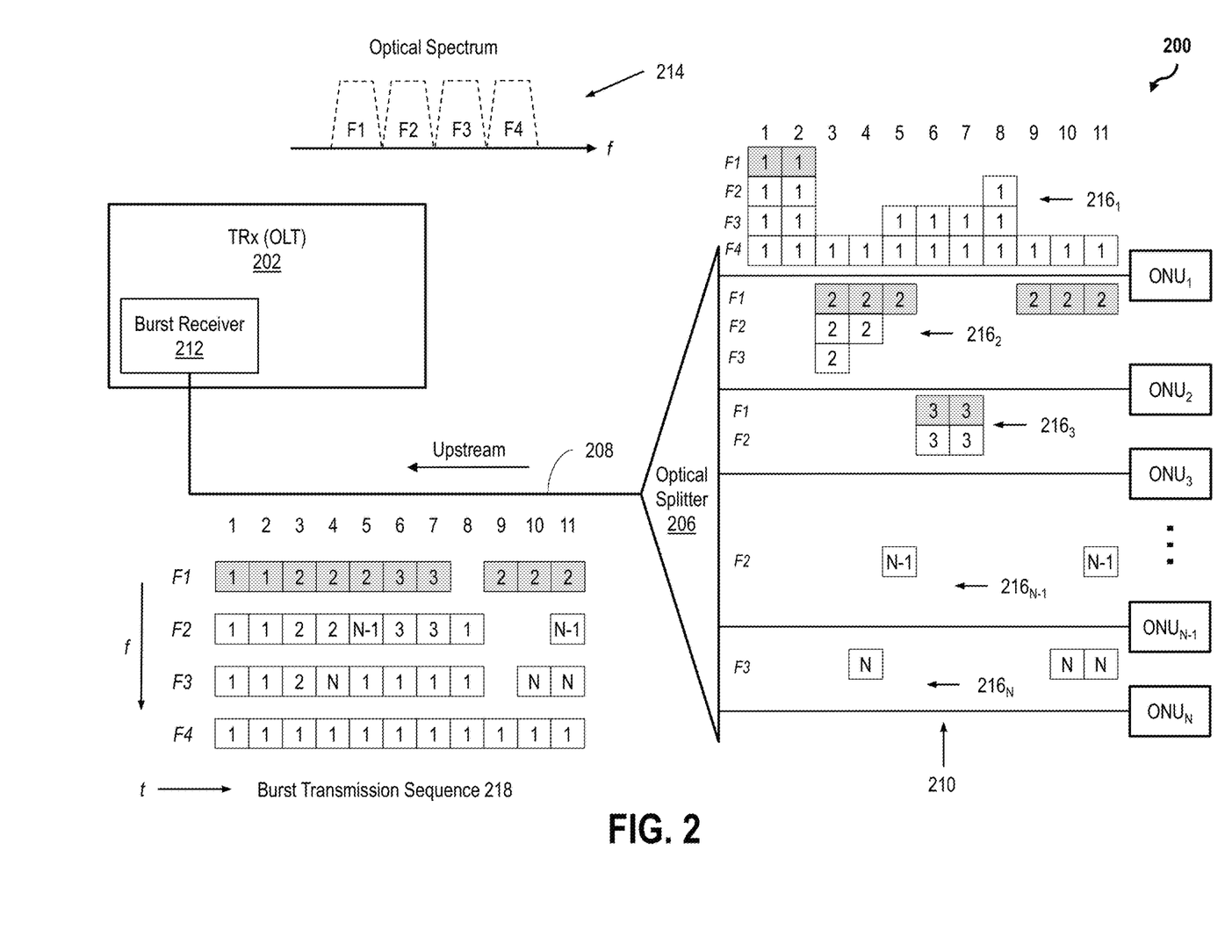
FIG. 2 is a schematic illustration of a coherent passive optical network system, in accordance with an embodiment.

FIG. 2 is a schematic illustration of a CPON system 200. In the exemplary embodiment depicted in FIG. 2, the overall topology of system 200 may be similar to conventional TDM PON system 100, FIG. 1, and include an upstream transceiver 202 (e.g., an OLT) servicing a plurality of downstream ONUs 204 (i.e., N ONUs 204, where N is an integer greater than 1) by way of an optical splitter 206, which operably links an optical transport medium 208 from upstream transceiver 202 to a plurality of local transport media 210 servicing individual ONUs 204, respectively.

For ease of illustration, optical transport medium 208 and local transport media 210 are depicted in FIG. 2 as optical fibers; however, the person of ordinary skill in the art will understand that some or all of the respective optical media 208, 210 may utilize FSO to transport respective optical signals upstream and downstream. The person of ordinary skill the art will further understand that terms such as "upstream" and "downstream" are used by way of example, and not in a limiting sense. That is, such terms merely establish the location of one transceiver in communication with another, remote transceiver across the CPON.

In the exemplary embodiment depicted in FIG. 2, system 200 represents a multi-channel CPON where upstream transceiver 202 includes at least one burst receiver 212 capable of receiving upstream burst transmissions from the plurality of ONUs 204 over multiple frequency bands of an optical spectrum 214. In this example, optical spectrum 214 is illustrated to utilize four contiguous frequency bands F1-F4 centered at optical spectrum frequencies $f_1$-$f_4$, respectively (e.g., each frequency band covering a 25G channel of a 100G CPON). More or fewer frequency bands though, may be implemented without departing from the scope herein.

In exemplary operation of system 200, OLT 202 communicates with the plurality of ONUs 204 to instruct each ONU regarding a respective upstream burst transmission 216 intended for reception by OLT 202. The respective upstream burst transmissions 216, which represent the individual resource allocation provided to each respective ONU 204, are then aggregated at optical splitter 206 into an aggregated burst transmission sequence 218 that is received by burst receiver 212. Different from conventional TDM PON system 100, FIG. 1, burst receiver 212 advantageously detects the respective signals of all four frequency bands F1-F4 simultaneously over a single aggregated channel. In contrast, conventional burst receivers would require four separate photodetectors and receiver processors to individually detected the four separate frequency bands.

OLT 202 and/or burst receiver 212 are advantageously configured to intelligently instruct ONUs 204 such that individual upstream burst transmissions 216 are scheduled not only according to the timing thereof, but also across the several frequency bands (e.g., F1-F4) of optical spectrum 214 such that one upstream burst transmission 216 from a particular ONU 204 does not overlap, in both the time and frequency, with another upstream burst transmission 216 from a different ONU 204. That is, as illustrated by aggregated burst transmission sequence 218, a transmitter (e.g., when instructing or allocating from the physical (PHY) layer) or scheduler (e.g., when instructing or allocating from the media access control (MAC) layer) of OLT 202 enables individual ONU bursts to overlap with other individual ONU bursts in one of time or frequency, but not both. In an exemplary embodiment, burst receiver 212 has advance knowledge of upstream transmissions from ONUs 204, and may thus configure aggregated burst transmission sequence independently of the operation of the transmitter or scheduler or OLT 202.

In the example illustrated in FIG. 2, burst transmission sequence 218 is depicted to utilize frequency band F1 as a control channel (e.g., or control messages and/or grants for ultra-low latency communication (ULLC)). The person borders skill me art though, will understand that this depiction is provided by way of example, and is not intended to be limiting. In some embodiments, the advantageous configuration and operation of system 200 further enables the capability to encrypt one or more of the several frequency bands for security purposes.

As further illustrated in FIG. 2, the resource allocation for upstream burst transmission $216_1$ from $ONU_1$ 204(1) occupies all four frequency channels of optical spectrum 214 (e.g., a 100G ONU for a 100G CPON), whereas the resource allocation for upstream burst transmissions $216_{N-1}$ and $216_N$ each occupy only one respective frequency channel of optical spectrum 214 (e.g., 25G ONUs for the 100G CPON). Alternatively, the advantageous resource allocation capabilities of system 200 enable the schedule to bundle particular frequency bands together for higher-speed transmission from a particular ONU, as depicted for upstream burst transmission $216_3$ (e.g., 50G). Accordingly, systems and methods according to CPON system 200 are advantageously enabled to achieve lower granularity ultra low latency (ULL), and flexible resource allocation schemes that allow selected ONUs 204 to transmit at higher or lower desired speeds.

In further exemplary operation of system 200, the individual ranging parameters used to achieve burst transmission sequence 218 may be intelligently adjusted based on expected or unexpected operational changes. That is, some changes to the operation of system 200 are considered to be known, or expected, because such changes are dependent on mechanisms within the control of the scheduler. For example, in the particular multi-channel upstream CPON use case depicted in FIG. 2, the knowledge of which ONU 204 is transmitting, and how that ONU 204 is transmitting, enables OLT 202/burst receiver 212 to determine the corresponding ranging parameter(s) adjustment for that ONU 204. In some embodiments, OLT 202 communicates the ranging parameter adjustment to the particular ONU 204 for pre-compensation. In other embodiments, OLT 202 itself executes the desired compensation for ranging parameter adjustment.

In other cases though, operational changes to system 200 are considered to be unknown. That is, system 200 will not have advance knowledge of when the change will occur, and may only detect and identify the change in real-time. Once the change is detected and identified, system 200 may alternatively employ a ranging bypass mechanism to adjust the ranging parameters, as described further below with respect to FIG. 3.

Figure 3:
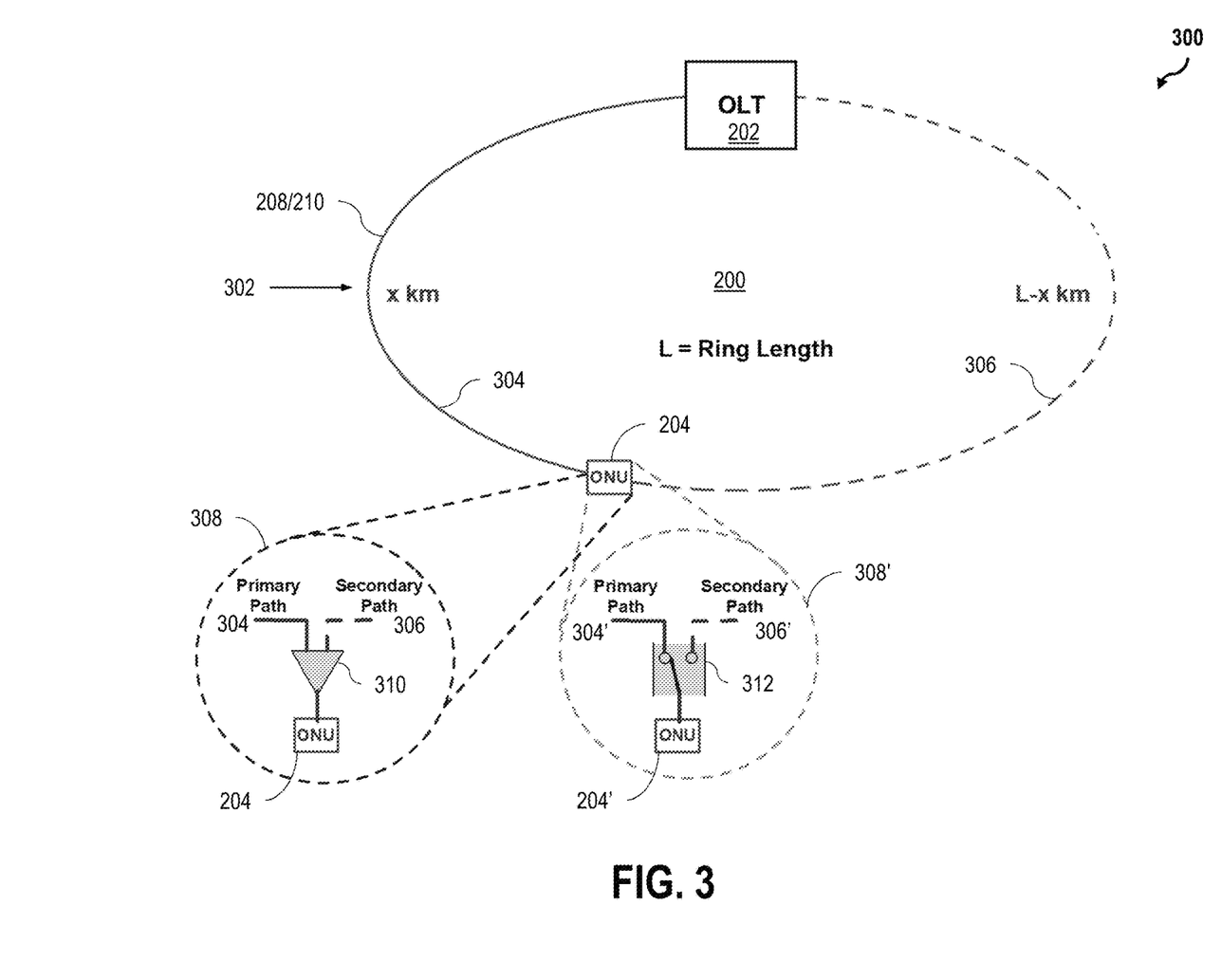
FIG. 3 is a schematic illustration depicting a path redundancy principle of the coherent passive optical network system depicted in FIG. 2.

FIG. 3 is a schematic illustration depicting a path redundancy principle 300 for CPON system 200, FIG. 2. In the exemplary embodiment depicted in FIG. 3, CPON system 200 is illustrated as utilizing a ring topology for optical transport medium 208 and local transport media 210. That is, transport media 208/210 form a ring 302 having a ring length L, and along which both OLT 202 and ONU 204 are disposed. OLT 202 may thus communicate with ONU 204 over either of a primary path 304 (i.e., of length x) of ring 302 and a secondary path 306 (i.e., of length L-x) of ring 302 according to operation of a path redundancy mechanism 308. In an exemplary embodiment, path redundancy mechanism 308 operates to enable communication between OLT 202 and ONU 204 over secondary path when communication over primary path 304 fails.

In exemplary operation of principle 300, mechanism 308 may include a detector 310 configured to automatically utilize secondary path 306 when the energy at a specific wavelength cannot be detected or is below a predetermined threshold value, such as in the case of a fiber cut or transmission interruption. In such cases, mechanism 308 may be further configured to automatically resume utilization of primary path 304 and energy is again detected at the specific wavelength. Alternatively, or additionally, mechanism 308 may include a switch 312 configured to enable a selective decision to choose between primary path 304 and secondary path 306 as desired.

Once the characteristics of primary path 304 are known or have been determined, the relevant characteristics of secondary path 306 may also be similarly known or determined. In a similar manner, ranging parameter changes leveraging the identified secondary path 3063 may also be already known or readily determined, thereby significantly abbreviating the entire ranging process by using bypass path redundancy mechanism 308 to communicate over secondary path 306. In an exemplary embodiment, OLT 202 (and/or burst receiver 212) may be further configured to store secondary path parameters in a memory (i.e., in communication with a processor thereof) for the case where secondary path 306 is utilized.

The exemplary systems and methods described above with respect to principle 300 are further of particular usefulness in the case where a future upgrade or change to system 200 is known and/or anticipated. In such cases, the ranging parameters for the secondary ranging state (i.e., communication along secondary path 306) may be established in advance to be immediately available when communication over secondary path 306 occurs. For example, in the case of a change from a 2-way splitter to a 4-way splitter, a secondary parameter set may be stored in the OLT memory to anticipate a new 3.5 dB-lower power level resulting from implementation of the 4-way splitter. As described further below with respect to FIGS. 4-7, intelligent ranging adjustment considerations described above yield further advantageous results four cascaded CPON architectures.

Figure 4:
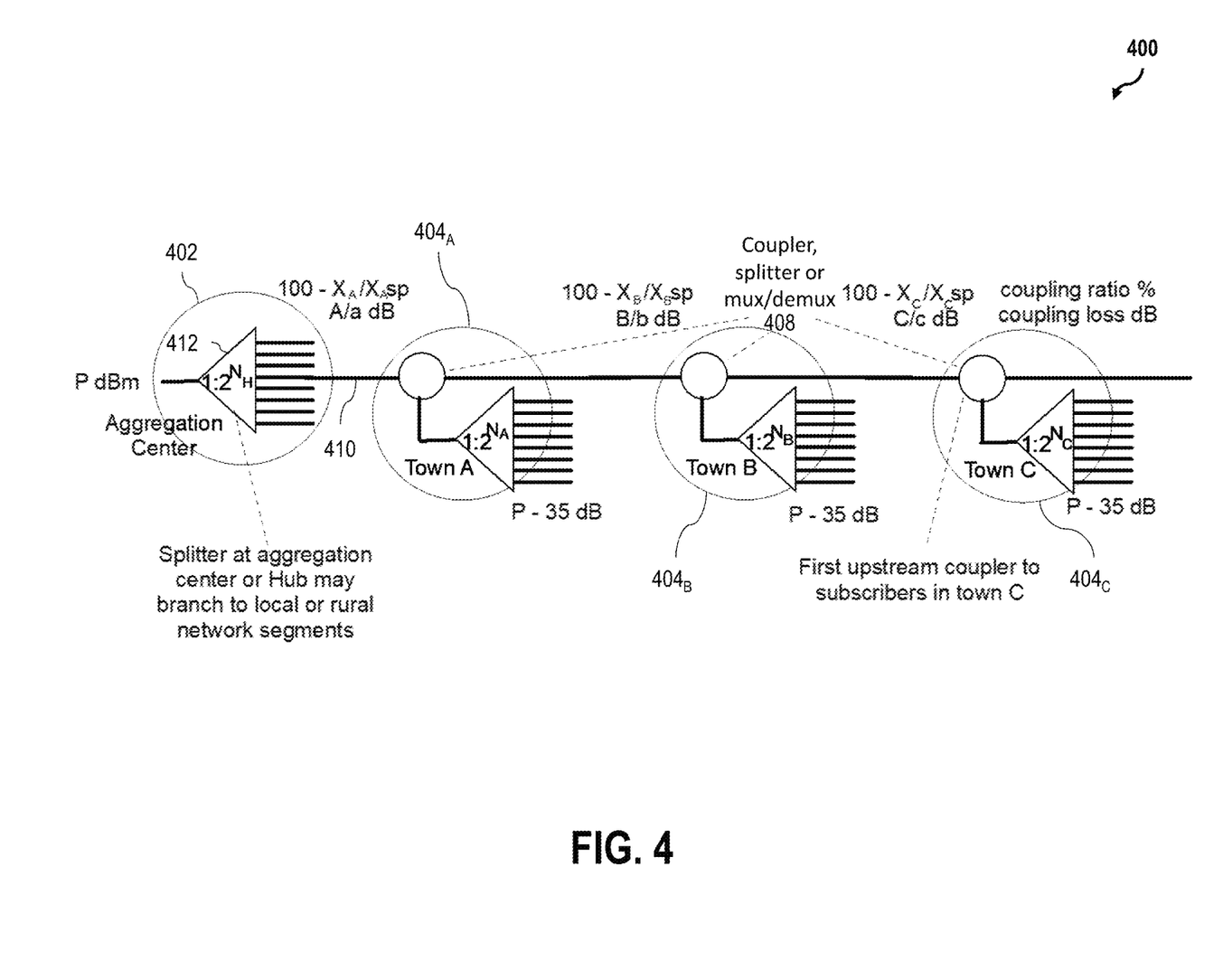
FIG. 4 is a schematic illustration of an exemplary cascaded coherent passive optical network architecture, in accordance with an embodiment.

FIG. 4 is a schematic illustration of an exemplary cascaded CPON architecture 400. In the embodiment depicted in FIG. 4, architecture 400 illustrates a simplified CPON topology split example from aggregation center 402 to a plurality of cascaded downstream distribution centers 404. In this example, aggregation 402 is depicted as an optical hub (e.g., containing an OLT), and each of cascaded downstream distribution centers 404 are depicted as respective town centers servicing multiple local subscribers to that town.

In the simplified example of architecture 400, town distribution centers 404 are illustrated to successively communicate (e.g., by way of couplers, splitters, and/or multiplexers/demultiplexers 408) with a single fiber segment 410 branching from a hub splitter 412 at aggregation center 402. For ease of explanation, each town distribution center 404 is shown to experience the same −35 dB power loss, and town distribution center 404A may considered to be physically closer in distance to the OLT at aggregation center 402 than town distribution center 404c.

In exemplary operation, knowledge of particular or expected changes to the topology of architecture 400 may be used to further estimate ranging information adjustments to advantageously avoid service disruptions. For example, whereas the downstream power delivered to each ONU at a respective town distribution center 404 may be the same, independent of the distance from the OLT to that ONU, the upstream power received at the OLT may be distance dependent. The number of splits available to architecture 400 may further be dependent on the optical power budget of the CPON. Such considerations are not significant to the conventional PON, which typically serviced approximately 32 end users, and therefore required very few splits in comparison to the CPON, which can service as many as 1000 users.

Thus, the topology of architecture 400 differs from a conventional PON topology in that, whereas the conventional PON executes electrical power splits, architecture 400 is enabled to advantageously perform optical power splitting to the respective cascaded downstream distribution centers 404. Optical power splitting may thereby utilize passive optical components instead of electrical components therefore realize less optical power loss in comparison with the conventional PON. In an exemplary embodiment, architecture 400 is further enabled to perform asymmetric optical tapping (AOT) to maintain approximately the same power level for each respective distribution center 404 by utilizing asymmetric couplers 408.

The comparative benefits realized according to architecture 400 are described further below with respect to FIGS. 5-8.

Figure 5:
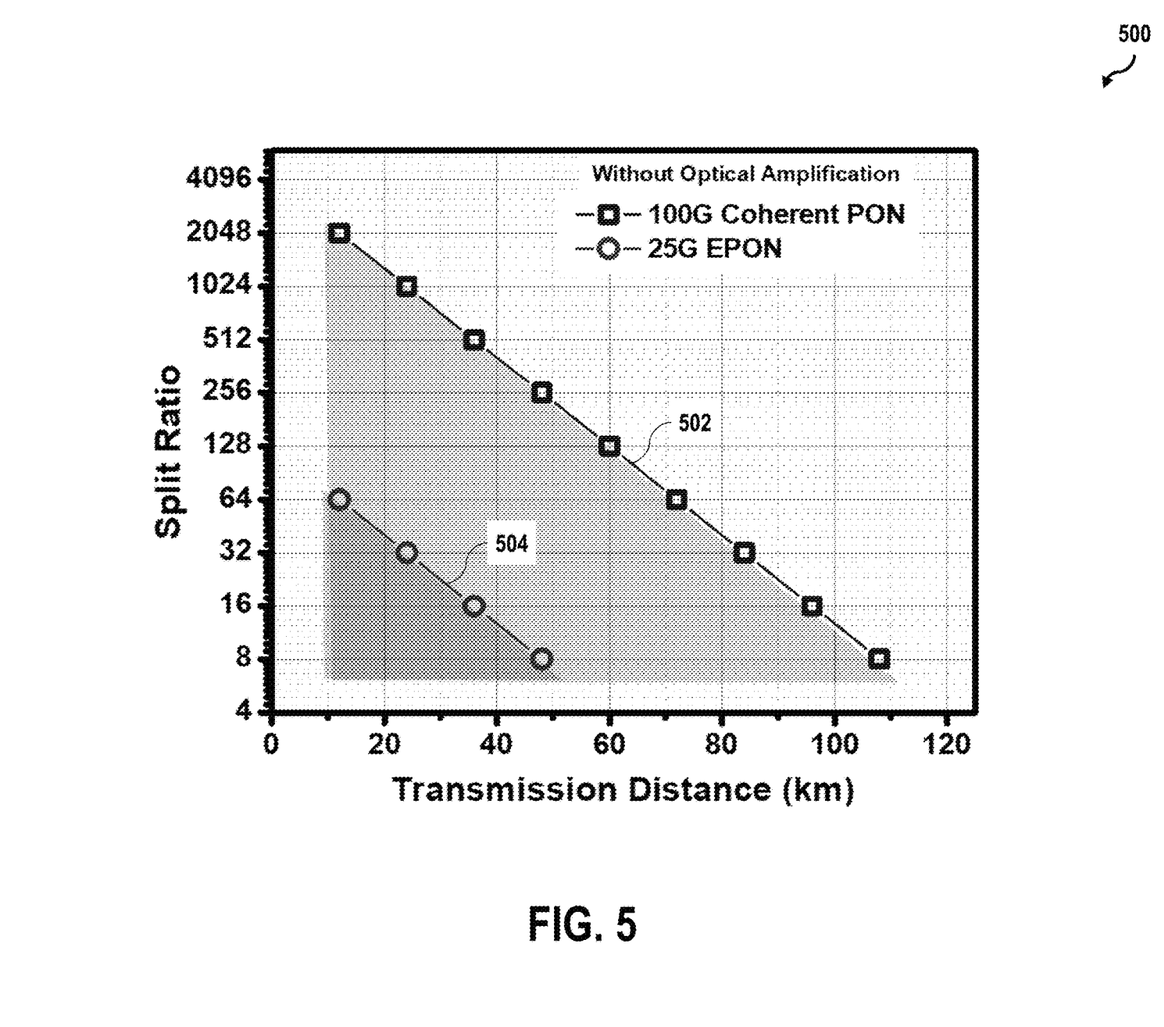
FIG. 5 is a graphical illustration depicting a comparative plot of coherent passive optical network performance against conventional passive optical network performance.

FIG. 5 is a graphical illustration depicting a comparative plot 500 of CPON performance against conventional PON performance. In the exemplary embodiment depicted in FIG. 5, split ratio is plotted against transmission distance for a 100G CPON, i.e., subplot 502, and for a conventional 25G NG EPON, i.e., subplot 504. As may be seen from comparative plot 500, the CPON demonstrates significantly greater performance flexibility than the conventional EPON. That is, significantly larger split ratios and longer transmission distances may be realized for the CPON, with many greater options to optimize the topology thereof according to the particular needs and/or conditions of the CPON deployment.

For the exemplary results depicted in comparative plot 500, the net data capacity was 100G for CPON subplot 502, and 25G for NG EPON subplot 504, with a 5-dB system margin (i.e., based on the IEEE/ITU-T standard), and realizing 2.5 dB/10 km fiber at C-band and 5 dB/10 km fiber at O-band. Comparing the area below subplot 502 with the area below subplot 504, it may further be seen that, relative to the 25G PON system, the CPON system provides a four times greater peak capacity, and with a 32 times higher split ratio or four times longer distance. In general, subplot 502, as well as the area need subplot 502, demonstrate that larger split ratios are optimal for high-density areas, whereas longer reach deployments may be particularly optimal for lower-density areas.

As described further below with respect to FIGS. 6 and 7, in the CPON, both the split ratio(s) and transmission distance(s) may be flexibly optimized according to a variety of different topologies that all fall within the area under subplot 502.

Figure 6:
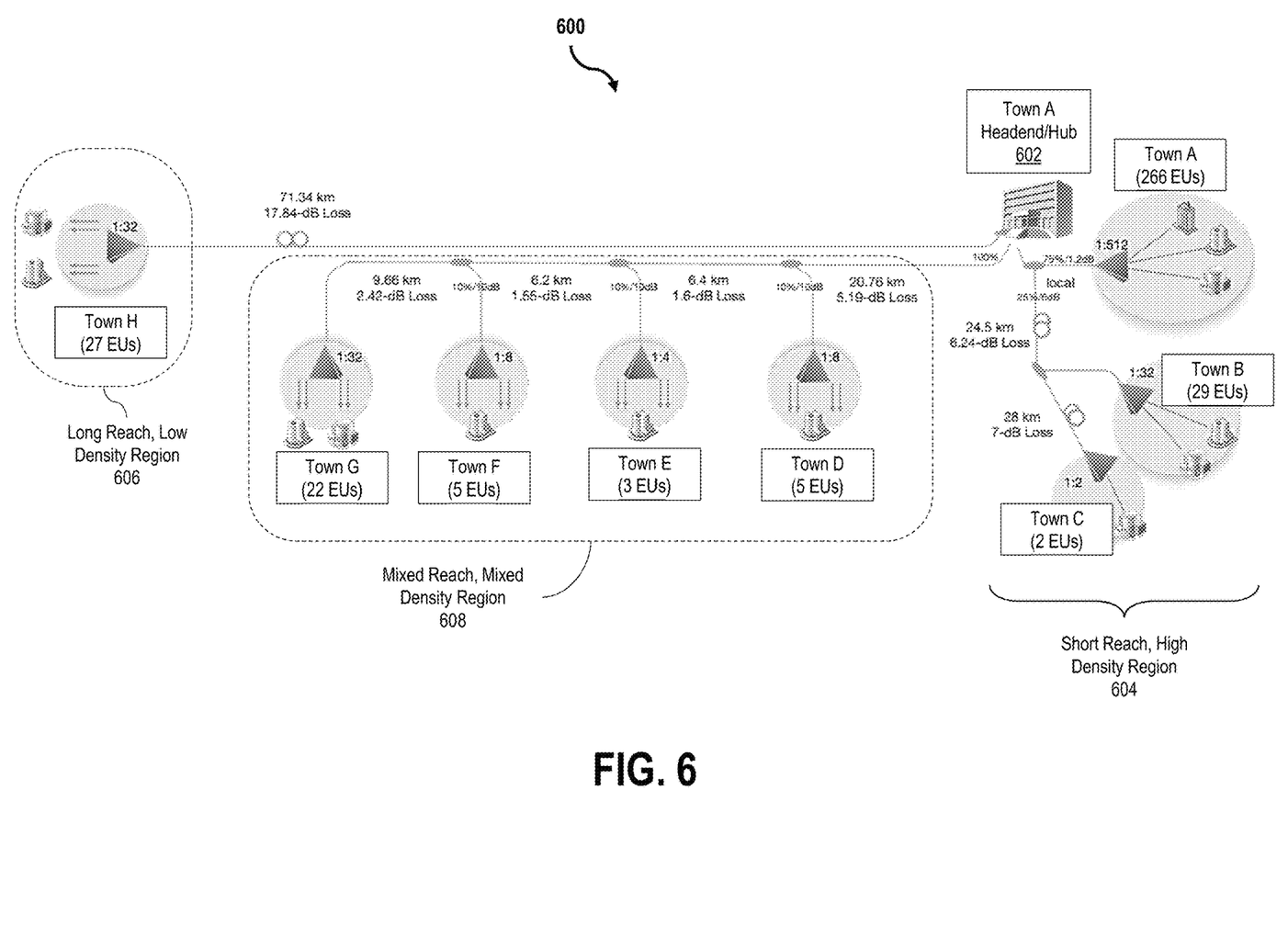
FIG. 6 is a schematic illustration depicting an exemplary coherent passive optical network implementation, in accordance with an embodiment.

FIG. 6 is a schematic illustration depicting an exemplary CPON implementation 600. CPON implementation 600 represents a CPON topology having 60 percent penetration, with one OLT location at a hub 602. In this example, the OLT at hub 602 includes three CPON OLT ports, zero P2P OLT backhaul links, and services 355 separate end user (EU) ONUs distributed among a plurality of town distribution centers A-H. Towns A-C collectively represent a short reach, high density region 604 including 297 separate EUs/ONUs, and town H individually represents a long reach, low density region 606 for 27 separate EUs/ONUs. According to the principles described herein, the topology of CPON implementation 600 is further flexibly enabled to service a hybrid region 608 of mixed reach and mixed density, that collectively serviced towns D-G cascaded at respectively increasing transmission distances and for different respective EU/ONU densities. That is, hybrid region 608 is similar to cascaded CPON architecture 400, FIG. 4, in aspects.

The performance benefits realized according to CPON implementation 600 are described further below with respect to FIG. 7, which effectively illustrates how a single CPON OLT is capable of servicing a variety of downstream distribution centers simultaneously, while being flexibly adaptable to the varying distances thereto and user densities thereof.

Figure 7:
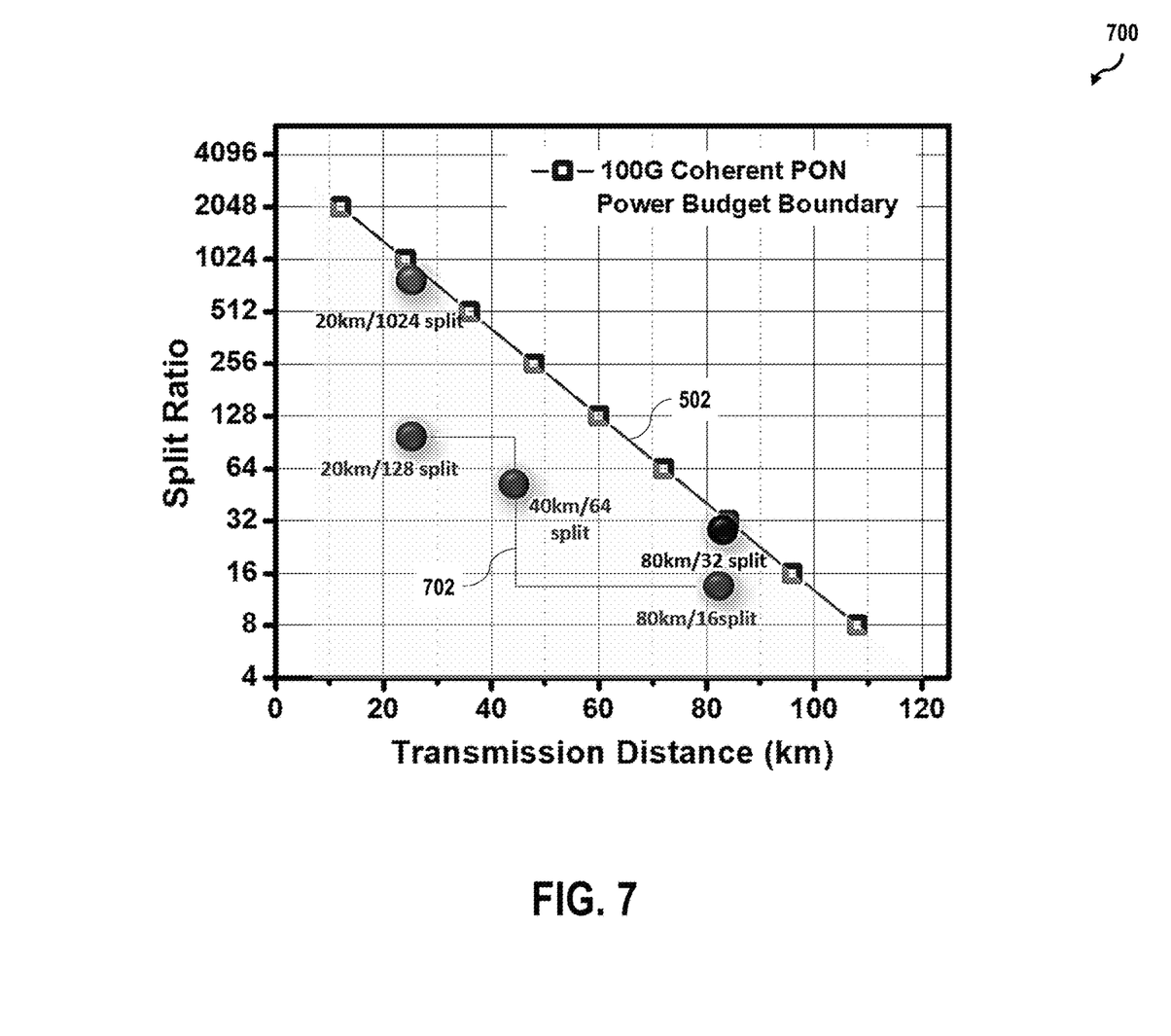
FIG. 7 is a graphical illustration of an exemplary performance plot of a coherent passive optical network according to the embodiments herein.

FIG. 7 is a graphical illustration of an exemplary performance plot 700 of a CPON according to the embodiments herein. In this example, an optimized performance subplot 702 of an exemplary CPON implementation (e.g., CPON implementation 600, FIG. 6) is superimposed against CPON subplot 502, FIG. 5, to demonstrate how the network model assists the determination of adjustments that may be needed or desired for the ranging parameters. Such determinations are of particular significance with respect to the transition from a single upstream channel (e.g., a single narrow subchannel band) to multiple subchannels.

As described above with respect to FIG. 2, in a multi-channel upstream CPON system, an ONU (e.g., ONUs 204, FIG. 2) may utilize power and allocated resources in either a single subchannel, or across multiple subchannels of the CPON optical spectrum (e.g., optical spectrum 214, FIG. 2). Nevertheless, a transition from a single subchannel to two or more subchannels may result in a power level decrease per channel. For example, in the case where the same amount of power is dedicated to a larger number of channels, the carrier-to-noise ratio (CNR) may potentially be approximately 6 dB. According to the systems and methods described herein, having knowledge of such power considerations a downstream ONU having multiple subchannel capability may thus be advantageously enabled to transition from a single channel to multiple subchannels on demand, and/or on a packet-by-packet basis, depending on the instantaneous demand of traffic.

The present embodiments are therefore further useful with respect to numerous existing transmission protocols, due to the fact that the number of existing protocols direct the OLT to instruct the ONUs when, and how much, data to transmit. Under these existing protocols, the OLT will therefore know what to expect from the respective ONUs, and is able to anticipate the power spectral density change on each channel. The intelligent algorithm(s) of the present systems and methods is/are therefore advantageously further capable of incorporating these predictable power spectral density changes into the ranging parameter adjustment determinations. In a similar manner, the present intelligent ranging algorithms may further flexibly incorporate changes (i) from one modulation order to another, and/or (ii) from one FEC setting (e.g., codeword length) to another.

As described above with respect to FIG. 3, unpredictable changes to the CPON signal path may occur due to such scenarios as a fiber cut or any transmission interruption in the primary path (e.g., primary path 304, FIG. 3). However, according to the present systems and methods, only the timing of such changes is unpredictable; the intelligent path redundancy and ranging bypass mechanisms of the present embodiments will know the new channel conditions in advance, since the alternate path (e.g., secondary path 306, FIG. 3) is already known and predetermined, or alternatively is easily estimated based on plant knowledge or readily measured as part of the ranging process. As described above, the alternate path ranging parameters that may be adjusted include, without limitation, power level, timing offset, and/or dispersion/distortion compensation.

The flexible receiver capabilities of the present embodiments are further advantageously useful with respect to future PON networks that implement multiple and intelligent modes of operation. For example, changes to the number of subscribers served by a single splitter are considered predictable, and therefore knowledge of the values and parameters the splitter, as well as coupler to which the splitter connects, enables an easy determination of the power level changes that result from a subscriber density change from that splitter.

The present system and methods are still further advantageous in comparison to conventional techniques, in that the present techniques enable a flexible variety of abilities to change the ranging parameters based on the complexity of the particular plant. For example, one particular set of ranging parameters may be used in the case where a fiber segment closest to the hub fails, but a different set of parameters may be used in the case of a different segment failing. Alternatively, a network operator may choose to adjust the parameters even in the case where there is no segment failure, but it may be economically desirable to allocate resources differently during particular times of day (e.g., high or low traffic times), or based on other traffic, performance, or demand conditions of the CPON. The intelligent algorithms of the present embodiments enable the network operator to implement seamless intelligent ranging processes that leverage significantly improved system flexibility, but without negatively impacting system performance. In some embodiments, the ranging parameters may be initially derived analytically. In other embodiments, the initial ranging parameters may be tried, tuned, and verified as part of an initial ranging process, such as the case before operation settles into steady-state operation conditions.

According to the innovative systems and methods described herein, effective techniques for realizing ranging parameter adjustment for burst reception, as well as optimized CPON deployment schemes, are achieved through implementation of improved intelligent ranging algorithms and/or ranging bypass/path redundancy mechanisms. The person of ordinary skill in the art though, will understand that these innovative techniques may be implemented with respect to other ranging examples or optical networks without departing from the scope herein.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be substituted with, or further include protocols such as EPON, RFOG, GPON, Satellite Internet Protocol, without departing from the scope of the embodiments herein. The present embodiments are therefore particularly useful for communication systems implementing a DOCSIS protocol, and may be advantageously configured for use in existing 4G and 5G networks, and also for new radio (NR), 5G-NR, 6G, and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general-purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An optical transceiver for a network communication system utilizing a coherent passive optical network (CPON), comprising:
    an upstream burst receiver system configured simultaneously detect (i) a first upstream burst transmission sent from a first downstream transceiver along a first frequency of an optical spectrum of the CPON, and (ii) a second upstream burst transmission sent from a second downstream transceiver along a second frequency of the optical spectrum different from the first frequency;
    a ranging unit configured to (a) execute a ranging process with the first and second downstream transceivers, and (b) adjust ranging parameters for at least one of the first and second downstream transceivers in real-time; and
    a bypass mechanism,
    wherein the first and second upstream burst transmissions do not overlap in the frequency domain,
    wherein (i) the first downstream transceiver is disposed along an optical communication medium remotely from the optical transceiver, and (ii) the second downstream transceiver is disposed along the optical communication medium remotely from the optical transceiver at a different location from the first downstream transceiver,
    wherein the upstream burst receiver system and the first downstream transceiver are configured to operably communicate over a first communication path of the optical communication medium, and
    wherein the bypass mechanism is configured to enable the first upstream burst receiver system to alternatively communicate with the first downstream transceiver over a second communication path of the optical communication medium different from the first communication path.

2. The optical transceiver of claim 1, comprising an optical line terminal (OLT).

3. The optical transceiver of claim 2, wherein one or more of the first and second downstream transceivers includes an optical network unit (ONU).

4. The optical transceiver of claim 1, wherein the optical spectrum spans a 100G frequency bandwidth containing four 25G frequency subchannels, including the first and second frequencies.

5. The optical transceiver of claim 4, wherein the upstream burst receiver system is further configured to simultaneously detect a third upstream burst transmission sent along two or more of the four 25G frequency subchannels simultaneously.

6. The optical transceiver of claim 5, wherein the upstream burst receiver system is further configured to simultaneously detect a fourth upstream burst transmission sent along all four 25G frequency subchannels simultaneously.

7. The optical transceiver of claim 4, further comprising a scheduler, and wherein the scheduler is configured to allocate resource blocks to a plurality of optical network units (ONUs) such that at least one particular subchannel of the four 25G subchannels is dedicated for use by control messages and/or grant requests.

8. The optical transceiver of claim 7, further comprising an optical line terminal (OLT) in operable communication with a splitter disposed between the OLT and the plurality of ONUs.

9. The optical transceiver of claim 8, wherein each ONU of the plurality of ONUs is (i) in operable communication with the splitter, (ii) configured to (i) receive downstream coherent burst resource allocations from the OLT, and (ii) configured to transmit at least one upstream burst signal to the OLT along at least one frequency subchannel of the optical spectrum.

10. The optical transceiver of claim 1, wherein the ranging parameters include at least one of an ONU power level, a delay value, a timing offset, a dispersion compensation value, and a distortion compensation value.

11. The optical transceiver of claim 1, wherein the ranging unit is further configured to instruct at least one of the first and second downstream transceivers to perform pre-compensation for at least one adjusted ranging parameter.

12. The optical transceiver of claim 1, wherein the ranging unit is further configured to execute a compensation operation on behalf of at least one of the first and second downstream transceivers for at least one adjusted ranging parameter.

13. The optical transceiver of claim 1, wherein the first communication path and the second communication path form a ring topology for an optical link of the network communication system.

14. The optical transceiver of claim 1, wherein the bypass mechanism is configured to automatically switch from the first communication path to the second communication path upon detection of an interruption in the first communication path.

15. The optical transceiver of claim 1, wherein the bypass mechanism is configured to switch from the first communication path to the second communication path based on fulfillment of a predetermined network condition.

16. The optical transceiver of claim 1, wherein the bypass mechanism is configured to operate invisibly to the ranging process executed by the ranging unit.

17. The optical transceiver of claim 1, comprising at least one of a network termination unit, a satellite termination unit, and a modem termination system (MTS).

* * * * *